(12) United States Patent
Duchene et al.

(10) Patent No.: US 10,401,812 B2
(45) Date of Patent: Sep. 3, 2019

(54) METHODS FOR CONTROLLING AND PARAMETERIZING A HOME AUTOMATION INSTALLATION AND HOME AUTOMATION INSTALLATION IMPLEMENTING SAID METHODS

(71) Applicant: Somfy SAS, Cluses (FR)

(72) Inventors: Isabelle Duchene, Marignier (FR);
Frederic Devis, Epagny (FR);
Pierre-Yves Cogne, Bogeve (FR);
Alexandre Espinasse, Marignier (FR)

(73) Assignee: SOMFY SAS, Cluses (FR)

( * ) Notice: Subject to any disclaimer, the term of this patent is extended or adjusted under 35 U.S.C. 154(b) by 665 days.

(21) Appl. No.: 13/777,661

(22) Filed: Feb. 26, 2013

(65) Prior Publication Data

US 2013/0226316 A1 Aug. 29, 2013

(30) Foreign Application Priority Data

Feb. 27, 2012 (FR) ...................................... 12 51761

(51) Int. Cl.
*G05B 15/02* (2006.01)
*G05B 19/02* (2006.01)
(Continued)

(52) U.S. Cl.
CPC ............ *G05B 19/02* (2013.01); *G05B 15/02* (2013.01); *G05B 19/0426* (2013.01);
(Continued)

(58) Field of Classification Search
CPC ........ G05B 2219/2642; G05B 19/0426; H04L 12/2803; H04L 12/2816; H04L 67/12;
(Continued)

(56) References Cited

U.S. PATENT DOCUMENTS 5,006,992 A * 4/1991 Skeirik ................ G05B 13/028
700/47
8,350,697 B2 * 1/2013 Trundle ................. G08C 19/16
340/539.3
(Continued)

FOREIGN PATENT DOCUMENTS

DE 3335226 A 4/1985
DE 10 2006 020121 A 11/2007
(Continued)

OTHER PUBLICATIONS

Extended Search Report issued by European Patent Office for corresponding application EP13156380.1 dated Sep. 19, 2013.
(Continued)

*Primary Examiner* — Darrin D Dunn
(74) *Attorney, Agent, or Firm* — Haug Partners LLP

(57) ABSTRACT

A home automation installation includes several sensors, several pieces of controlled home automation equipment, and a control unit communicating with the sensors and the controlled home automation equipment. To control this installation, it is provided to select a control scenario by the control unit for at least one parameterized sensor from among the sensors, at a current moment belonging to a periodic time range from among one or more time ranges associated with the parameterized sensor, and as a function of at least one current value of the signal coming from the parameterized sensor, then to send, by the control unit to at least one of the pieces of controlled home automation equipment, at least one order depending on the selected control scenario. To parameterize the control unit, a procedure is provided consisting of choosing a sensor to be parameterized from among at least one periodic activation time range and/or at least one periodic inhibition time range and associating at least one control scenario with at least one
(Continued)

state or a change of state of the signal from the sensor to be parameterized.

18 Claims, 4 Drawing Sheets

(51) Int. Cl.
*G05B 19/042* (2006.01)
*G06F 3/0488* (2013.01)
*G06F 3/0486* (2013.01)

(52) U.S. Cl.
CPC .......... *G06F 3/0486* (2013.01); *G06F 3/0488* (2013.01); *G05B 2219/23258* (2013.01); *G05B 2219/2642* (2013.01)

(58) Field of Classification Search
CPC . H04L 12/2825; H04L 12/2827; H04L 41/22; H02J 2003/143; H04W 52/0254; H04W 88/00; H04W 24/10; H04W 72/1278; H04W 28/0215; H04W 52/02; H04W 52/0258; H04W 52/0274
See application file for complete search history.

(56) References Cited

U.S. PATENT DOCUMENTS

| | | | | |
|---|---|---|---|---|
| 8,429,435 | B1* | 4/2013 | Clayton | H04L 12/10 700/19 |
| 2002/0158775 | A1* | 10/2002 | Wallace | H04B 3/54 340/870.07 |
| 2003/0229471 | A1* | 12/2003 | Guralnik | G06K 9/00496 702/182 |
| 2005/0119767 | A1* | 6/2005 | Kiwimagi | G05B 19/042 700/19 |
| 2005/0159911 | A1* | 7/2005 | Funk | G05B 19/418 702/104 |
| 2006/0125632 | A1* | 6/2006 | Luebke | H04L 12/2803 340/539.26 |
| 2006/0173847 | A1* | 8/2006 | Peterson | G06F 17/30153 |
| 2006/0218244 | A1* | 9/2006 | Rasmussen | H04L 67/12 709/218 |
| 2006/0253205 | A1* | 11/2006 | Gardiner | G05B 15/02 700/19 |
| 2007/0087726 | A1* | 4/2007 | McGary | H04M 3/42068 455/404.1 |
| 2008/0307238 | A1* | 12/2008 | Bieswanger | G06F 1/206 713/300 |
| 2008/0312754 | A1* | 12/2008 | Nielsen et al. | 700/7 |
| 2009/0119068 | A1* | 5/2009 | Banting | G01R 19/2513 702/188 |
| 2009/0171166 | A1* | 7/2009 | Amundson | A61B 5/0002 600/301 |
| 2010/0138007 | A1* | 6/2010 | Clark et al. | 700/90 |
| 2010/0145479 | A1* | 6/2010 | Griffiths | 700/17 |
| 2010/0211222 | A1* | 8/2010 | Ghosn | G01D 4/002 700/276 |
| 2010/0211618 | A1* | 8/2010 | Anderson | G06F 17/30548 707/812 |
| 2010/0222708 | A1* | 9/2010 | Hitchcock | A61B 5/036 600/591 |
| 2010/0235667 | A1* | 9/2010 | Mucignat | G06F 1/3203 713/323 |
| 2010/0277300 | A1* | 11/2010 | Cohn | G08B 29/02 340/506 |
| 2011/0066262 | A1* | 3/2011 | Kelly et al. | 700/90 |
| 2011/0188419 | A1* | 8/2011 | Filoso | H04W 52/0216 370/311 |
| 2012/0065789 | A1* | 3/2012 | Scelzi et al. | 700/291 |
| 2012/0074852 | A1* | 3/2012 | Delnoij | H05B 37/0218 315/158 |
| 2012/0158161 | A1* | 6/2012 | Cohn | H04L 12/2827 700/90 |
| 2013/0085615 | A1* | 4/2013 | Barker | 700/277 |
| 2013/0170417 | A1* | 7/2013 | Thomas et al. | 370/311 |
| 2017/0302469 | A1* | 10/2017 | Cohn | G08B 29/02 |
| 2017/0337806 | A1* | 11/2017 | Cohn | G08B 25/003 |

FOREIGN PATENT DOCUMENTS

| | | |
|---|---|---|
| EP | 2 000 867 A | 12/2008 |
| FR | 2 586 833 A | 3/1987 |
| WO | WO 2007/124786 A | 11/2007 |

OTHER PUBLICATIONS

Vaillant: "Betriebsanleitung VRC-CB", Feb. 28, 1987, version 3, pp. 1-16, dated Feb. 28, 1987.
Search Report issued by French Patent Office for priority application 12 51761 dated Oct. 29, 2012.

* cited by examiner

METHODS FOR CONTROLLING AND PARAMETERIZING A HOME AUTOMATION INSTALLATION AND HOME AUTOMATION INSTALLATION IMPLEMENTING SAID METHODS

This application claims priority benefits to French Patent Application Number 1251761 filed Feb. 27, 2012, the entire disclosure of which is herein incorporated by reference.

TECHNICAL FIELD OF THE INVENTION

The invention relates to a home automation installation, i.e., broadly speaking, an installation including communicating pieces of electrical equipment, which may or may not be motorized, in a building, in particular a residential building. It also relates to a controller for such an installation and means for facilitating parameterization of such a controller.

BACKGROUND OF THE INVENTION

Patent application WO2007/124786A1 describes a home automation installation provided with sensors and controlled home automation equipment. Each sensor may be associated with two control scenarios, one when the measured level is below a threshold, and the other when the measured value is above that threshold.

These control scenarios are directly programmed into the electronics of the sensor. Thus, the sensor sends the actuator an order that is the code associated with the control scenario corresponding to the measurement of the present moment and the actuator that receives that order is capable of interpreting it and taking action.

This installation makes it possible to use control scenarios to control the home automation installation, but is difficult to parameterize: the installer must define, at each sensor, the measurement threshold beyond which a different control scenario is sent. This repeated manipulation requires considerable time and may also impose particular measures to protect the installer working on the installation, if the sensor is placed in an inaccessible location (at a height against a wall, for example), which is particularly detrimental if it must be manipulated several times. Furthermore, the sensors used in this installation are specific, inasmuch as they only send an order in the form of a control scenario code, or are versatile in that they can send a value or a code corresponding to the control scenario. In both cases, the cost of such sensors is high. Likewise, the controlled home automation equipment must integrate more significant means for processing the information than the traditional actuators to be able to associate a control scenario code with concrete actions.

Patent application EP2000867A1 describes how it is possible to associate a control scenario with a measurement level of a sensor. For example, a sensor and a roller shutter motor are placed in programming mode; a threshold is selected at the sensor; the roller shutter is placed in a given position by setting the motor in motion; communication is established between the two in order to associate that measurement level with the position of the motor.

Here again, the matching phase may be delicate and require particular protection measures for people working on the installation, since the sensor may be in an area that is difficult to access. Likewise, the installation procedure may be tedious, as it is necessary to perform this operation for each sensor and each actuator to be associated. The size of the installation is then limited or very expensive.

BRIEF DESCRIPTION OF THE INVENTION

The invention aims to resolve the drawbacks of the state of the art and to propose means capable of facilitating the control, programming, and reprogramming of a home automation installation.

According to a first aspect of the invention, there is provided a method for controlling a home automation installation including several sensors, several pieces of controlled home automation equipment, and a control unit communicating with the sensors and the pieces of controlled home automation equipment, including the following steps:
  selecting with the control unit and for at least one parameterized sensor from among the sensors, at a current moment belonging to a periodic time range from among one or more time ranges associated with the parameterized sensor, and as a function of at least one current value of the signal coming from the parameterized sensor, a control scenario
  sending, with the control unit to at least one of the pieces of controlled home automation equipment, at least one order depending on the selected control scenario.

The method thus makes it possible to perform, from a single control unit communicating with the sensors and the pieces of controlled home automation equipment, a wide variety of control scenarios, which may include one or more orders, sent to one or more pieces of equipment, simultaneously or according to a predetermined sequence.

According to one embodiment, the method includes a step of previously storing the one or more periodic time ranges associated with the parameterized sensor.

According to one embodiment, the method includes a step of storing, for the parameterized sensor, at least one control scenario associated with a state or change of state of the signal coming from the parameterized sensor. The state or the change of state may in particular be:
  a value range delimited by at least one threshold value associated with the parameterized sensor, or
  a passage from a first value range delimited by a threshold value associated with the parameterized sensor to a second value range delimited by the threshold value, or
  a state value of the parameterized sensor, which proves particularly suitable for a sensor delivering a low number of state values, for example a sensor delivering binary information or information with no more than eight states on a byte.

According to one embodiment, the method includes a step of previously storing the one or more threshold values associated with the parameterized sensor.

According to one embodiment, the order sent to the piece of controlled home automation equipment is a code identifying the selected control scenario, the method also including a step of carrying out the order with the piece of home automation equipment controlled as a function of the selected control scenario code, programmed into the piece of controlled home automation equipment. It is thus possible to lighten the tasks performed by the control unit, and to move part of the complexity of the performance of the orders to the onboard intelligence in the piece of controlled home automation equipment. Alternatively, it is possible to provide that the control scenario stored in the control unit includes, for a given piece of home automation equipment, a series of orders, some of which may depend on a return of information from the considered piece home automation equipment.

According to one embodiment, the method also includes a prior step of storing one or more control scenarios, each of the control scenarios being associated with at least one predetermined periodic time range and at least one value of at least one signal from among the signals coming from the sensors.

According to one embodiment, a prioritization procedure is provided including:
  associating at least one state or change of state with at least one priority sensor among the sensors with a high priority level and with a high-priority control scenario,
  whenever a state or change of state associated with a high priority level occurs, sending with the control unit to at least one of the pieces of controlled home automation equipment at least one order depending on the high-priority control scenario and inhibiting the selection of at least one other control scenario.

It is thus possible to avoid contradictory orders being given to the piece of controlled home automation equipment. If the priority sensor is connected to a function related to the safety of people or safety of the building, it is possible to provide that the occurrence of the state or change of state associated with the high priority level inhibits the selection of any scenario other than the priority scenario. It is also possible to provide several priority levels, the fire sensors for example having an absolute priority, and intrusion sensors having an intermediate priority level, greater than that of other sensors, for example sun sensors.

Particularly advantageously, the method may also include a programming or parameterization procedure, including at least the following steps:
  choosing a sensor to be parameterized among the sensors;
  associating at least one periodic activation time range and/or at least one periodic inhibition time range with the sensor to be parameterized; and
  associating at least one state or change of state of the signal coming from the sensor to be parameterized with at least one control scenario.

This parameterization procedure using successive and intuitive steps makes it possible to have the installation carry out complex orders, simultaneously depending on time ranges and the actual state of the environment or the installation itself, as measured by at least some of the sensors. The parameters chosen during the parameterization are either stored completely in the control unit, or stored partially in the control unit and partially transmitted to the sensors themselves. The programming can preferably be done using a programming interface, for example including a graphic display and an input interface, which may for example be combined in a touchscreen.

According to one embodiment, it is provided that the periodic activation time range and/or the periodic inhibition time range can be defined by at least one of the following elements or a combination of the following elements:
  at least one time range,
  at least one day of the week or month,
  at least one month of the year.

The assignment step may include selecting at least one threshold value of the signal coming from the sensor to be parameterized and selecting at least one first control scenario assigned to a value interval bounded by the threshold value. For a sensor delivering a signal that varies in a given range, it is thus possible to determine a number N of threshold values, if applicable making it possible to define up to N+1 intervals, and to assign control scenarios to one or more of those intervals.

Alternatively, the procedure may include selecting at least one threshold value of the signal coming from the sensor to be parameterized and selecting at least one first control scenario assigned to a passage of the signal from the sensor to be parameterized past the threshold value in a predetermined direction.

Alternatively, the procedure may include selecting at least one state value of the signal coming from the sensor to be parameterized and selecting at least one first control scenario assigned to the state value. This procedure will be particularly suitable for sensors delivering binary signals of the open/closed, temperature threshold or sunshine exceeded or not exceeded, etc. type.

According to one embodiment, the method includes a step of selecting one program from among several possible programs, the steps of selecting a sensor to be parameterized among the sensors, associating the sensor to be parameterized with at least one periodic activation time range and/or at least one periodic inhibition time range, and associating at least one control scenario with at least one state or change of state of the signal from the sensor to be parameterized being allocated to the selected program.

It is thus possible to provide several programs, each for example associated with different recurring time ranges for a given sensor, for example a program associated with time ranges valid certain days of the week and a program associated with other time ranges valid other days of the week, each program being associated with specific control scenarios taking place as a function of the state of the sensor in the specified time ranges.

The step of choosing the sensor may also include a preliminary step of choosing a type of sensor from among several types of sensors, followed by step of choosing a sensor of the chosen type from among several sensors of the chosen type. It will thus be possible, through successive steps, to select the desired sensor in a large installation including many sensors of various types. One given type of sensors will for example include temperature, sunshine, or wind strength sensors, or sensors located in a given geographical area of the building.

According to one embodiment of the invention, the method includes at least one prior step of defining control scenarios. Each control scenario may include one or more orders, given to one or more pieces of controlled home automation equipment, simultaneously or sequentially. Inasmuch as the definition of the control scenarios may prove relatively complex, it may be preferable, according to one embodiment, to reserve programming thereof for a qualified operator, while the programming of the choice of sensors, activation thresholds, and periodic time ranges may be more widely accessible to the end user occupying the equipped building. Alternatively, one may decide to open the programming of all or some the control scenarios to the end user. According to one embodiment, it is provided to associate an order to be transmitted to at least one of the pieces of controlled home automation equipment with at least one control scenario.

According to one embodiment, the method includes a step of sending with the control unit to at least one of the sensors, a sleep signal at the beginning of the periodic inhibition time range, and a wake-up signal at the beginning of the periodic activation time range.

According to another aspect of the invention, there is provided a method for parameterizing a home automation installation including several sensors, several pieces of controlled home automation equipment and a control unit communicating with the sensors and the controlled home automation equipment, characterized in that it includes the following steps carried out by means of a programming interface connected to the control unit:

choosing a sensor to be parameterized from among the sensors;

associating at least one periodic activation time range and/or at least one periodic inhibition time range with the sensor to be parameterized; and associating at least one state or change of state of the signal from the sensor to be parameterized with at least one control scenario.

This parameterization method makes it possible to simply and intuitively define an operation of the installation developed taking the time ranges and values of signals into account to select and carry out operating control scenarios. This programming method may also include all or some of the characteristics of the programming procedure described relative to the first aspect of the invention.

According to another aspect of the invention, there is provided a control unit and a home automation installation for implementing the control method and/or the programming method according to the previous aspect of the invention. A control unit here is a functional unit, preferably made in the form of a structural unit, inside a unitary housing.

More specifically, and according to another aspect of the invention, the invention relates to a control unit for a home automation installation including several sensors, several pieces of controlled home automation equipment, the control unit communicating with the sensors and the pieces of controlled home automation equipment and including:

means for receiving signals from the sensors;

means for storing one or more control scenarios, each of the control scenarios being associated on the one hand with at least one periodic time range associated with at least one parameterized sensor from among the sensors, and on the other hand with at least one state or change of state of a signal from the parameterized sensor;

means for selecting at least one current control scenario from among the one or more stored control scenarios, when the state or change of state of the parameterized sensor associated with the current control scenario occurs at a current moment in the associated periodic time range; and means for sending the piece of controlled home automation equipment at least one order depending on the current control scenario.

According to another aspect of the invention, the invention relates to a control assembly including the control unit previously described and a programming interface connected to the control unit, the interface having a graphic display displaying:

at least one screen to choose a sensor to be parameterized from among the sensors;

at least one screen for associating the sensor to be parameterized with at least one periodic activation time range and/or at least one periodic inhibition time range; and at least one screen for associating at least one control scenario with at least one state or change of state of the signal from the sensor to be parameterized.

The control unit and the programming interface can be combined in a single structural unit, with a shared housing, or may form two distinct structural units, each with its own housing, communicating by a wired or wireless connection.

According to another aspect of the invention, the invention relates to a home automation installation including several sensors, several pieces of controlled home automation equipment, and a control unit or an assembly as previously defined communicating with the sensors and the pieces of controlled home automation equipment. Preferably, at least one and preferably several of the sensors make up units that are structurally distinct from the control unit, therefore arranged in separate housings, not integrated into the housing of the control unit and remote from the housing of the control unit. Likewise, at least one and preferably several of the pieces of controlled home automation equipment make up units that are structurally distinct from the control unit, therefore arranged in distinct housings, not integrated into the housing of the control unit and remote from the housing of the control unit.

According to another aspect of the invention, the invention is generalized to a home automation installation only including one piece of controlled home automation equipment or one sensor, and a control method and a programming method for such an installation.

The various aspects of the invention offer many advantages, and in particular:

multiple control scenarios to optimize the operation of the home automation installation under all circumstances;

great flexibility of the installation, allowing a large number of combinations around one control unit and, if applicable, a single programming interface;

the possibility of using the sensors for purposes other than those for which they were initially intended (for example, a temperature sensor outside a boiler that will also be used to determine whether it is summer or winter and to cause different management of the roller shutters);

the possibility, owing to the control unit, of making products and sensors compatible that previously were not, and in particular the possibility of combining sensors and pieces of controlled home automation equipment with different protocols; and implementing much higher performing automation than a simple system integrating actions according to the time range without accounting for actual conditions.

BRIEF DESCRIPTION OF THE FIGURES

Other features and advantages of the invention will emerge from reading the following description, in reference to the appended figures, which illustrate.

DETAILED DESCRIPTION OF THE INVENTION

Figure 1:
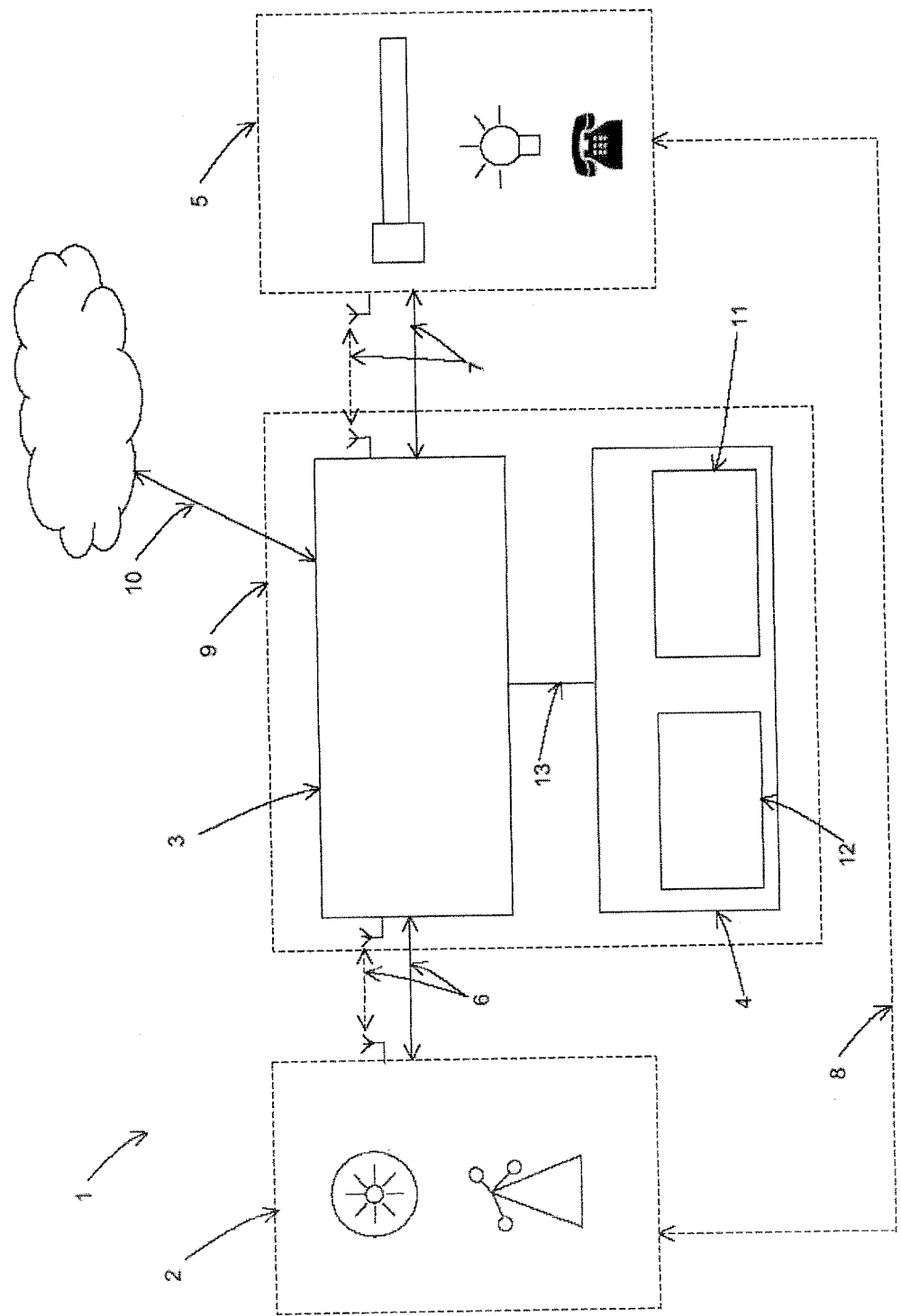
FIG. 1, a diagrammatic illustration of a home automation installation implementing the invention.

FIG. 1 diagrammatically illustrates a home automation installation 1 comprising sensors 2. The sensors 2 may be of quite varied types: for example, a sun, temperature, wind, or rain sensor, as well as a motion detector of an alarm, a detector for the opening of a door or window, a smoke detector, etc. Each sensor 2 measures a physical property and sends a receiver information that may be of a more or less complex nature: binary information to indicate that a threshold has been exceeded, or a numerical value providing a precise indication of the state of the sensitive element.

In all cases, the sensors 2 can communicate with a control unit 3 and are wired or wireless. This communication 6 may be one-way, i.e., the sensor 2 sends information but is not capable of receiving information, or two-way, i.e., the sensor 2 can send information and can also receive information (for example in the form of an acknowledgement for information just sent). The control unit to that end incorporates communication means that include at least one receiver for receiving information from the sensors, and if applicable transmission means.

The control unit 3 has computation means, at least one memory, and wired and/or wireless means.

The control unit 3 is in communication with the pieces of controlled home automation equipment 5 by means of a communication 7, which may be wired or wireless, one-way or two-way. To that end, the control unit 3 includes transmission means including at least one transmitter and, if applicable, a receiver if the communication is two-way. In practice, if the communication is two-way with at least some of the sensors and at least some of the pieces of controlled home automation equipment, the receiver used to receive the signals from the sensors can also be used to receive the information from the pieces of controlled home automation equipment, whereas the transmitter used to send messages, in particular orders, to the pieces of controlled home automation equipment may also serge to send messages to the sensors. The control unit may also be connected to a remote network using the Internet.

A programming interface 4 is connected with the control unit 3. This programming interface 4 allows the user to parameterize or program the home automation installation 1, and to enter the information necessary for the proper operation thereof. Likewise, using this interface 4, the user may obtain feedback on the state of the home automation installation. Generally, this interface 4 comprises a graphic display 11 displaying the information on the state of the home automation installation 1, and an input interface 12 by which the user can enter information. Preferably, this graphic display 11 and this input interface 12 are a single and same object in the form of a touchscreen display.

In one embodiment of the invention, the control unit 3 and the programming interface 4 are assembled in a same housing to form a control module 9. This embodiment offers the advantage of being compact.

Alternatively, the control unit 3 and the programming interface 4 are remote and communicate with each other by a communication channel 13 that may be wired or wireless. This solution is chosen when it is possible to arrange the control unit 3 in a discreet location of the building (for example, in the garage) and place the programming interface 4 as close as possible to the living space to facilitate manipulation thereof. This is for example the case when the programming interface 4 is made up of onboard software on a touchscreen tablet or a mobile telephone, for example.

The pieces of controlled home automation equipment 5 are also of quite varied types. This may for example be motors for setting sun protection devices in motion such as roller shutters or blinds, garage door or gate motors, lamps, an alarm, communication means making it possible to send messages to emergency services or just to the user, etc.

The sensors 2 communicate toward the control unit 3, which centralizes all of the information. In some cases, the sensors 2 may also communicate directly with a piece of controlled home automation equipment 5. These are in particular security functions, for example such as initiating a smoke sensor that will communicate with the control unit 3, but also through a communication channel 8 (wired or wireless) with a siren to alert the user as quickly as possible and eliminate any breakdown that may occur at the central unit 3. The same may be true for an outdoor blind motor and its associated wind sensor in case of excessive wind.

Preferably, the control unit 3 has a central position in the home automation installation 1 and has more significant computation and memory means than the sensors 2 or the pieces of controlled home automation equipment 5. The latter may thus be very simple, i.e., measuring means for the sensors or motor means for the pieces of controlled home automation equipment, as well as communication means for sending information or receiving orders, without any additional computation or memory means. The cost of these sensors 2 or pieces of home automation equipment 5 is therefore reduced.

Such an architecture also offers the advantage of being compatible with old sensors 2 or pieces of home automation equipment 5, inasmuch as they can communicate with the control unit 3. The constant evolution of the home automation installation 1 is therefore possible.

Likewise, the invention facilitates communication with sensors 2 or pieces of controlled home automation equipment 5 communicating using different protocols that may be included in the home automation installation 1, and associated with other sensors 2 or pieces of controlled home automation equipment 5 that were incompatible until then. In fact, inasmuch as the communications go through the control unit 3, the latter need only be provided with these protocols so that it can act as a bridge between the various protocols.

The home automation installation 1 operates as follows: the sensors 2 measure the value of a physical parameter (light level, temperature, etc.) and send the information to the control unit 3. The information is sent as either a numerical value or binary information, for example specifying whether a threshold has been crossed. The control unit 3 receives the information and determines which orders to send the pieces of controlled home automation equipment 5 as a function of the received value and the present moment. The orders correspond to control scenarios that were predefined by the user during a so-called programming or parameterization procedure, upon starting up the home automation installation 1 or during modifications during use. These control scenarios include at least one instruction for at least one piece of controlled home automation equipment. Preferably, a control scenario corresponds to a set of orders intended for several pieces of controlled home automation equipment that are coherent and make it possible to optimize at least one management perimeter of the building. For example, in order to optimize the energy consumption of the building in winter, it may be interesting to lower all of the sun protection means as the light disappears, whereas they were open to store as much solar energy as possible through the windows.

The control unit 3 is connected to a programming interface 4 provided with an input interface 12 and graphic display means 11. Preferably, this programming interfaces is an LCD or other monitor, having a touchscreen such that the user presses and slides his finger over the graphic objects placed on the monitor to enter the commands or information he wishes.

To parameterize the association of value levels of the sensors with control scenarios, the preferred interface of the invention operates as follows.

Figure 2:
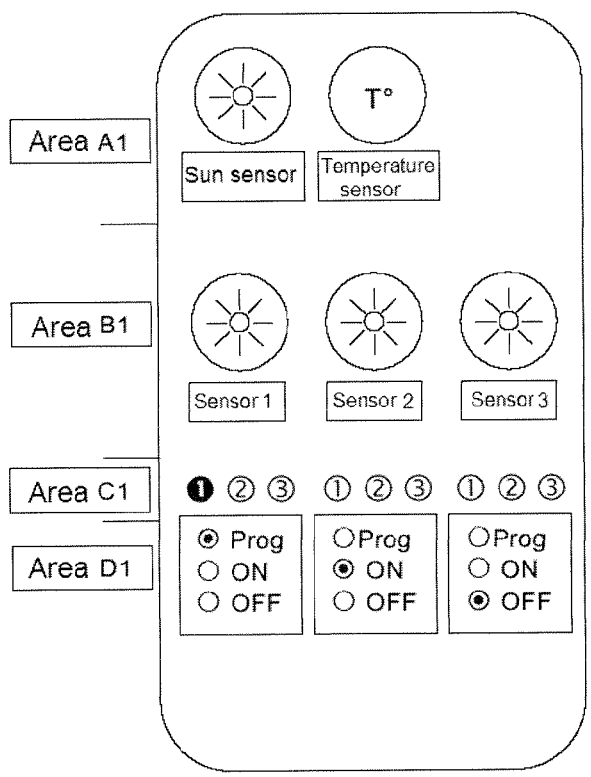
FIG. 2, an illustration of a first screen of a programming interface of the installation of FIG. 1.

On the first screen shown in FIG. 2, the programming interface is divided into four areas: a first area A1 in which the families of sensors available in the home automation installation 1 are shown, a second area B1 where the available sensors belonging to a family of sensors are listed and named, a third area C1 making it possible to select a program (here among three programs each designated by a number in FIG. 2, and which we will designate P1, P2, P3 in the continuation of the description), and a fourth area D1 in which, for each available sensor 2 program, the three possible states appear (off, on, and programming mode). Each of the illustrated elements can be selected by the user. In the first area A1, the user selects the family of sensors 2 he wishes to program. In the second area B1, the user can select a particular sensor 2 in the selected sensor family.

In the area D1, the user can choose the operating mode of the selected sensor 2. The "ON" mode indicates that the sensor is operating in a default mode, according to a default program that cannot be modified, which may or may not call on the control unit. In this default mode, it is possible to provide that the sensor communicates directly with one or more pieces of controlled home automation equipment. The "OFF" operating mode indicates that the sensor is not on. The "Prog" operating mode is a programmable mode that will now be explained in detail.

Figure 3:
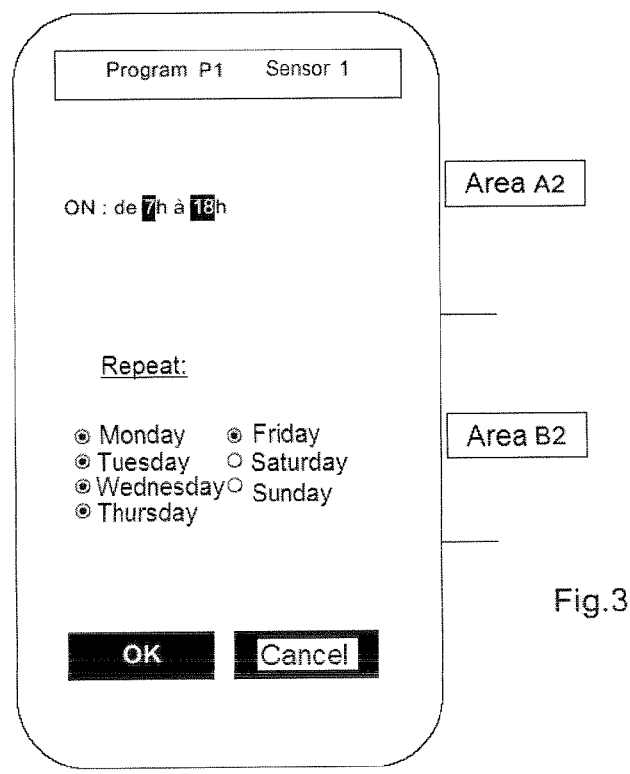
FIG. 3, an illustration of a second screen of the programming interface of the installation of FIG. 1.

If, for a given program P1, P2, P3 preselected in area C1, the user selects the programming mode for a sensor 2, a second screen appears, illustrated in FIG. 3. This second screen is divided into two areas: an area A2 in which the user can select time ranges of the day and an area B2 in which the user can choose days of the week. In the area A2, the user has the possibility of dividing the 24 hours of a day into as many periodic time ranges as he wishes. For example, he may decide to divide his day into three periodic time ranges, a night range from midnight to 7 AM, the second from 7 AM to 6 PM, and the third from 6 PM to midnight. At the interface, it is only necessary to specify the periodic time ranges during which the sensor will be active. In this example, this will simply be the period from 7 AM to 6 PM. By default, the remaining periodic time ranges are those during which it is inhibited. This division may for example correspond to a day of the week where he works outside the home, the two extreme periodic time ranges corresponding to his periods of presence in his residence, the intermediate periodic time range being a period of absence. In the area B2, he can choose the days of the week for which that division is applicable. In the previous example, this division corresponds to the work days of the week or, in this case, Monday through Friday. These days will therefore be selected. The other two will not. According to one alternative not shown, it is also possible to consider potentially choosing other periodic time ranges, for example week and/or month numbers of the year.

This second screen makes it possible to choose the periodic time ranges during which the sensor 2 will be active, or during which the information it sends will be inhibited.

In the previous example, the user could choose for the sensor information to be taken into account only in the intermediate periodic time range, since he is away from home and allows the automation to manage optimization of the energy consumption in the building while taking the information from a light sensor 2 into account.

A validation area allows the user to return to the first screen.

Figure 4:
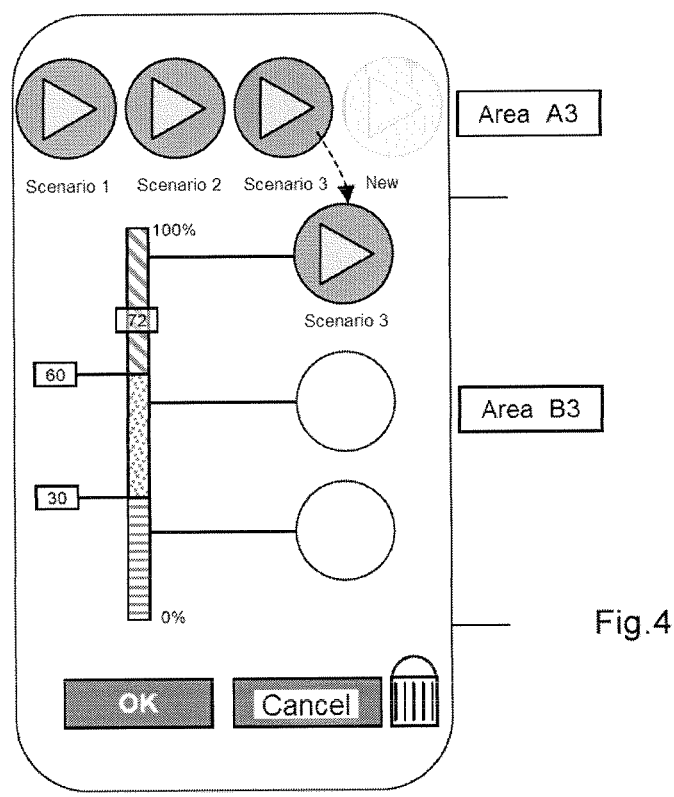
FIG. 4, an illustration of a third screen of the programming interface of the installation of FIG. 1.

If, still for a given program preselected in area C1, the user this time selects the sensor 2 that itself is in area B1, a third screen appears, shown in FIG. 4.

This third screen is divided into two areas: an area A3 where the various available control scenarios for that sensor are shown, and a second area B3 in which a possible value scale for the data sent by the sensor is shown. In the illustrated example, three control scenarios are accessible to the user in the area A3 and a fourth can be created. These control scenarios have been created beforehand using the programming interface 4, and were then sent to the control unit 3, which stores them. In one preferred embodiment of the invention, the programming interface simply stores the name and the fact that the control scenario is available. As a result, the memory size occupied by the data corresponding to the control scenarios is smaller.

Figure 5:
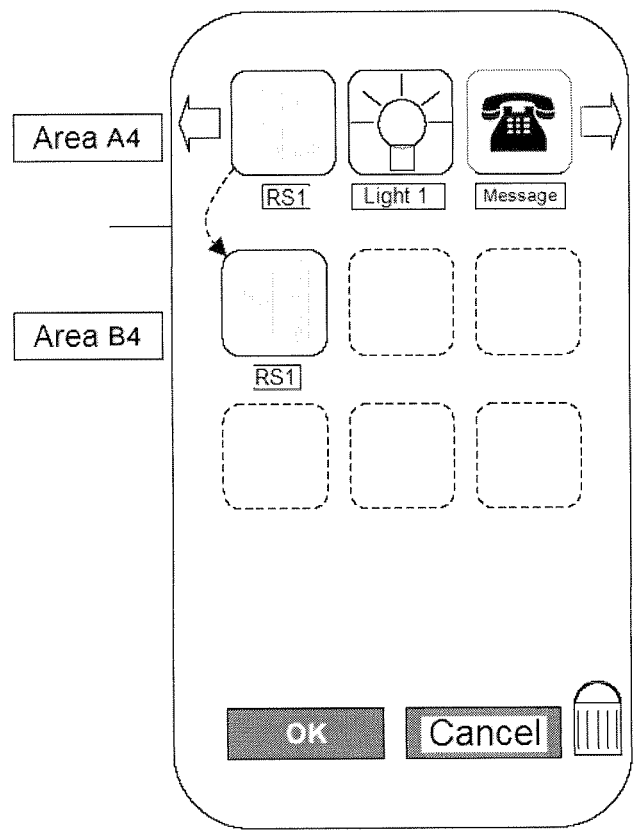
FIG. 5, an illustration of a fourth screen of the programming interface of the installation of FIG. 1.
Figure 6:
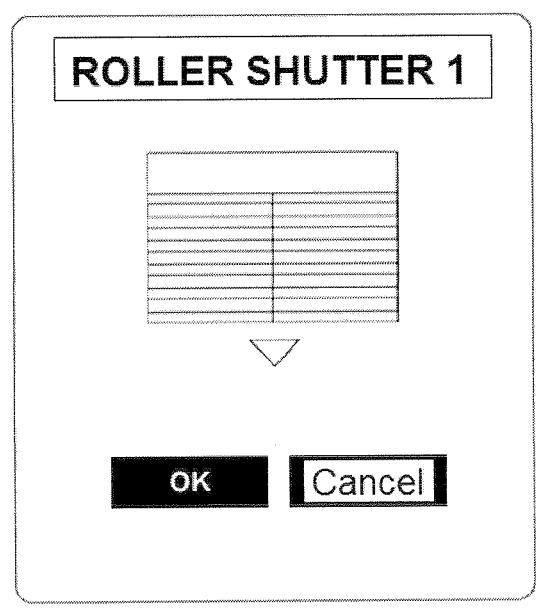
FIG. 6, an illustration of a fifth screen of the programming interface of the installation of FIG. 1.

In the control scenario creation mode, a fourth screen is available, reproduced in FIG. 5. The screen is divided into two main parts: an area A4 where the icons for the various pieces of controlled home automation equipment 5 available in the building and controlled by the control unit 3 appear, and an area B4 grouping together the icons for the pieces of controlled home automation equipment 5 actually involved in a control scenario. A new piece of equipment is selected for which a control scenario must be applied using the "slide" function of the touchscreen display to transfer the icon for the piece of equipment 5 from area A4 to a free slot of area B4. When a piece of controlled home automation equipment 5 has been placed in that area B4, a fifth window, reproduced in FIG. 6, is displayed with an illustration of the piece of controlled home automation equipment and the possibility of adjusting its state. In the example illustrated in FIG. 6, the piece of controlled home automation equipment is a roller shutter motor and the associated roller shutter. For the control scenario being created, it is decided to place it in intermediate position, for example 50% of its normal opening. When the control scenario is carried out, this roller shutter will be positioned in the requested position, i.e., 50%. This operation will be reproduced for each piece of controlled home automation equipment affected by the control scenario, irrespective of its type (motor, light, alarm, telephone, etc.). When the control scenario is complete, i.e., each concerned piece of controlled home automation equipment is programmed, the user validates the save and is returned to the previous screen. During this operation, the control means may use the programming interface to request a name to store that control scenario in memory. The control scenario may also be named automatically.

Returning to the third screen of FIG. 4, the area B3 has several pieces of information: at the center of a scale providing the possible values provided by the sensor 2, on the left part at least one value threshold is displayed, and on the right part the name of the control scenario selected for each scale part is displayed. In the programming phase, the user varies the level of the threshold values. In the present example, the "slide" function of the touchscreen is used, i.e., the user positions his finger on the parameter to be modified and slides it on the screen to reach the desired value. Once the thresholds are set, they divide the scale into the same number of parts as the number of thresholds plus one. Each scale part can be shown by a different color.

Furthermore, the current value returned by the sensor 2 is displayed on the scale (in the example illustrated in FIG. 3, this value is 72%).

Each part of the defined scale has a corresponding area in which the user can associate a particular control scenario. In this example, the user also uses the "slide" function by selecting one of the control scenarios placed in the area A3 and positioning it in the area corresponding to the scale part one wishes to associate with that control scenario.

If one wishes to modify the control scenario associated with a scale part, the same principle can be used to drag that control scenario into the trashcan appearing on another part of the screen, for example at the bottom, and to restart the operation with a new control scenario, or, still more simply, to slide the new selected scenario directly onto the previous control scenario.

Once the adjustments are done, a validation key allows the user to return to the first screen.

These operations make it possible to parameterize the home automation installation 1 to operate automatically according to the user's desires. For example, the operating mode chosen by the user corresponds to table 1 reproduced below.

example, the user provides a fourth control scenario when the light is maximal, for example to lower his blinds midway and thereby avoid being bothered by excessive light. Likewise, he reuses the first control scenario to close all of his roller shutters if the light drops below low values corresponding to the end of the day.

This is only one example of programming, and many other combinations are possible with different types of sensors, for example temperature sensors, motion detectors, gas sensors (CO2), smoke detectors, etc.

The actions may also be quite varied, for example such as acting on pieces of controlled home automation equipment relative to sun protection, as well as the operation of a siren, the sending of a telephone message or an electronic message, etc.

The user may define control scenarios for each sensor, and the control unit 3 will be able to manage the priorities either parameterized by the supplier of the technology, or because the user himself has parameterized his desired priorities. For example, the safety sensors 2 such as smoke detectors will take priority over all other sensors. Likewise, alarm sensor detecting an intrusion will take priority over a sun sensor to

TABLE 1

| | Mon. | | | Tues. | | | Wed. | | | Thurs. | | | Fri. | | | Sat. | | Sun. | |
|---|---|---|---|---|---|---|---|---|---|---|---|---|---|---|---|---|---|---|---|
| Sensor Sunshine | 0 h- 7 h | 7 h- 18 h | 18 h- 14 h | 0 h- 7 h | 7 h- 18 h | 18 h- 24 h | 0 h- 7 h | 7 h- 18 h | 18 h- 24 h | 0 h- 7 h | 7 h- 18 h | 18 h- 24 h | 0 h- 7 h | 7 h- 18 h | 18 h- 24 h | 0 h- 9 h | 9 h- 24 h | 0 h- 9 h | 9 h- 24 h |
| Prog. No. | | | | | | | | P1 | | | | | | | | | | P2 | |
| 0%-30% | IN | Sc1 | IN | IN | Sc1 | IN | IN | Sc1 | IN | IN | Sc1 | IN | IN | Sc1 | IN | IN | Sc1 | IN | Sc1 |
| 31%-60% | IN | Sc2 | IN | IN | Sc2 | IN | IN | Sc2 | IN | IN | Sc2 | IN | IN | Sc2 | IN | IN | Ø | IN | Ø |
| 61%-100% | IN | Sc3 | IN | IN | Sc3 | IN | IN | Sc3 | IN | IN | Sc3 | IN | IN | Sc3 | IN | IN | Sc4 | IN | Sc4 |

In this example, the user has chosen to divide his day into three periodic time ranges as in the aforementioned example. The concerned sensor 2 is a light sensor whereof the information will be inhibited (IN) during the two extreme periodic time ranges (0 h-7 h and 18 h-24 h), and used in the intermediate periodic time range, i.e., 7 h-18 h, for the days Monday through Friday. The values of the sensor 2 are standardized in this example to express them as a percentage and for example create two thresholds that generate three value ranges. For the same sensor, it will be possible to define other hourly periodic time ranges for the non-selected days. In that event, another program is selected (for example P2) to redefine hourly periodic time ranges. In the example of table 1, the days Saturday and Sunday are divided into two periodic time ranges with different hours.

If one examines the operation of the home automation installation 1 relative to this table, one can see that the user has chosen to apply three different control scenarios (Sc1, Sc2, Sc3) for the three value ranges of the sensor. If we consider that this is in the winter, this could make it possible to keep a roller shutter closed when the light is low (0%-30%) and the building cannot benefit from solar energy contributions, to open them only on the south side of the building when the light is intermediate, and to open them completely when the light is maximal and the heat contributions may be significant.

The automation will work in this way every day Monday through Friday. On Saturday and Sunday, the user considers that he will be present in the residence. He has for example divided his day into two hourly time ranges: one from 0 h to 9 h where the sensor is inhibited, the other from 9 h to 24 h where he anticipates being active in his residence. In this close all of the roller shutters when the contrary order has been generated by the control scenarios related to said second sensor.

Likewise, it is not necessary to use sensors 2 that send a numerical value. The sensors 2 that send a binary value for example corresponding to crossing a predefined threshold may be integrated into the home automation installation 1 without it being possible to adjust the threshold and with only two predefined states.

When the information from a sensor 2 must be inhibited, two methods may be implemented: either the control unit 3 does not take that information into account in its management of the home automation installation, or the control unit 3 sends an order to the sensor 2 at the beginning of the periodic time range so that it goes on standby for a given period or until a wake-up order arrives.

Another example of programs that may exist is the definition of a program associated with a sensor for the behavior of the home automation installation at dawn (raising roller shutters, heating the bathroom, starting the coffee maker, etc.), and another for dusk (closing the roller shutters, heating bedrooms, starting lights in the living area, etc.).

Naturally, various alternatives are possible. According to one alternative of the third screen illustrated in FIG. 7, at least some of the control scenarios are not allocated to value ranges of the signal from a sensor, but rather directly to thresholds and especially to directions in which those thresholds are exceeded, characterizing changes in the state of the signal from the sensor and, in fine, the physical parameter monitored by the sensor. In fact, part of the scale may be vast and the behavior of the home automation installation does not necessarily need to be identical when, returning to the previous example, the light goes from 29% to 31% or when it goes from 61% to 59%. The user can thus allocate two control scenarios to a scale part that will be carried out according to the threshold that has been crossed. The graphic representation of this operating mode is slightly different inasmuch as the control scenarios are associated with the thresholds and an arrow signifies the direction in which the threshold must be crossed for the control scenario to be implemented.

Figure 7:
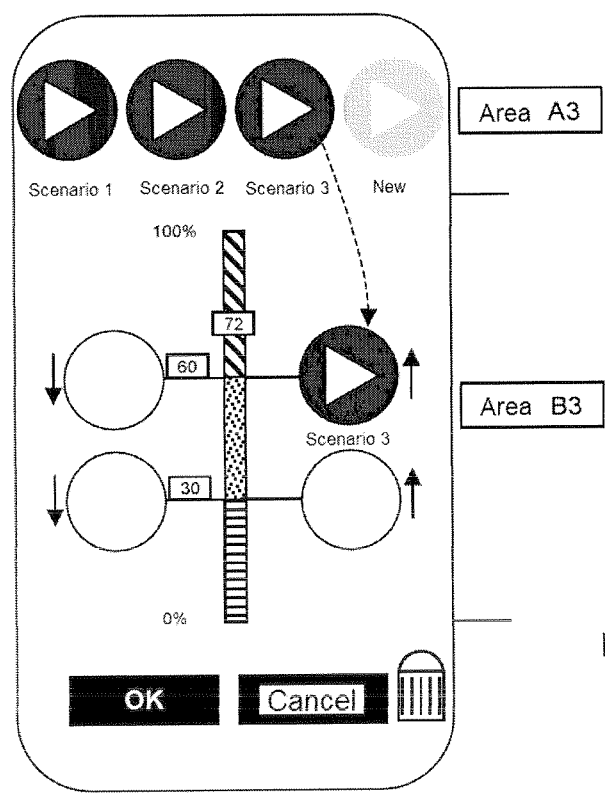
FIG. 7, an illustration of a screen of an alternative of the programming interface.

To return to the example illustrated in table 1, the user using the principle of crossing thresholds illustrated in FIG. 7 will perform the same type of linking, which will be to keep the roller shutters closed when the light is low (0%-30%), to open them only on the southern side when the light increases and enters the intermediate range, to open them completely when the light increases further and becomes maximal, and to leave them in the same state when the light decreases and returns to the intermediate level. In this case, the control scenario may simply be empty, which means not changing the state of the pieces of controlled home automation equipment 5 when it is called upon.

It can be provided that the programming interface 4 and the control unit 3 are dedicated to only one of the value range (FIG. 4) or threshold crossing (FIG. 7) programming modes. It is also possible to provide that a same control unit 3 and a same programming interface 4 can allow parameterization of the control scenarios according to both of the programming modes. It is for example possible to provide that the user sliding, in FIG. 4, the line connecting the control scenario to the value range of the sensor from its position illustrated in the center of a value range to a threshold value of the range in question, causes an automatic passage to the screen of FIG. 7.

What is claimed is:

1. A method for controlling a home automation installation including several sensors, several pieces of controlled home automation equipment, a control unit communicating with the sensors and the pieces of controlled home automation equipment and a programming interface connected to the control unit,
wherein the method includes:
a parameterization procedure, comprising the following steps:
selecting with the programming interface at least one parameterized sensor from among the sensors;
associating a periodic time range, from among one or more time ranges, with the parameterized sensor, wherein said periodic time range is defined by one or more of: at least one time range during a day, at least one day of the week or of the month, and at least one month of the year;
associating at least one least one state or change of state of a signal from the parameterized sensor with at least one control scenario; and
storing the at least one control scenario in the control unit,
wherein the at least one control scenario is selected according to the periodic time range associated with the parameterized sensor and according to the at least one state or change of state of a signal from the corresponding parameterized sensor; and
a control procedure, following the parameterization procedure, comprising the following steps:
receiving, with the control unit, at least one current value of a signal coming from the parameterized sensor;
responding by sending with the control unit, to at least one of the pieces of controlled home automation equipment, at least one order depending on the at least one control scenario as stored in the control unit during the parameterization procedure; and
controlling the at least one of the pieces of controlled home automation equipment according to the at least one order.

2. The method of claim 1, further including a step of previously storing the one or more periodic time ranges associated with the parameterized sensor.

3. The method of claim 1, further including a step of storing, for the parameterized sensor, at least one control scenario associated with a state or change of state of the signal coming from the parameterized sensor.

4. The method of claim 3, wherein the state or the change of state is one of the following:
a value range delimited by at least one threshold value associated with the parameterized sensor, or a passage from a first value range delimited by a threshold value associated with the parameterized sensor to a second value range delimited by the threshold value, or a state value of the parameterized sensor.

5. The method of claim 4, further including a step of storing the one or more threshold values associated with the parameterized sensor.

6. The method of claim 1, further including a prioritization procedure including:
associating at least one state or change of state with at least one priority sensor among the sensors with a high priority level and with a high-priority control scenario, whenever the state or change of state associated with a high priority level occurs, and
sending with the control unit, to at least one of the pieces of controlled home automation equipment, at least one order depending on the high-priority control scenario inhibiting the selection of at least one other control scenario.

7. The method of claim 1, wherein the order sent to the at least one of the pieces of controlled home automation equipment includes a code identifying the selected control scenario, and
wherein controlling the at least one of the pieces of controlled home automation equipment comprises carrying out the order with the at least one of the pieces of controlled home automation equipment as a function of the selected control scenario code, the order being programmed into the at least one of the pieces of controlled home automation equipment.

8. The method of claim 1, wherein the step of associating at least one control scenario includes at least one of the following steps:
selecting at least one threshold value of the signal coming from the sensor to be parameterized and selecting at least one first control scenario assigned to a value interval bounded by the threshold value;
selecting at least one threshold value of the signal coming from the sensor to be parameterized and selecting at least one first control scenario assigned to a passage of the signal from the sensor to be parameterized from a first value range delimited by the threshold value to a second value range delimited by the threshold value; and
selecting at least one state value of the signal coming from the sensor to be parameterized and selecting at least one first control scenario assigned to the state value.

9. The method of claims 1, further including:
selecting one program from among several possible programs,
wherein the steps of selecting a sensor to be parameterized among the sensors further includes:
associating the sensor to be parameterized with the at least one periodic activation time range or at least one periodic inhibition time range,
associating the at least one control scenario with at least one state or change of state of the signal from the sensor to be parameterized, and
allocating the at least one control scenario to the selected program.

10. The method according to claim 1, wherein the step of selecting the at least one parameterized sensor also includes a preliminary step of choosing a type of sensor from among several types of sensors followed by a step of choosing a sensor of the chosen type from among several sensors of the chosen type.

11. The method of claim 1, further including at least one step of associating at least one control scenario with at least one order to be sent to at least one of the pieces of controlled home automation equipment.

12. A method for parameterizing a home automation installation including several sensors, several pieces of controlled home automation equipment, a control unit communicating with the sensors and the pieces of controlled home automation equipment, and a programming interface connected to the control unit, the method including a parameterization procedure, comprising the following steps:
choosing a sensor, with the programming interface, to be parameterized from among the sensors;
associating at least one periodic activation time range and/or at least one periodic inhibition time range with the sensor to be parameterized, wherein said periodic activation and/or deactivation time range is defined by one or more of: at least one time range during a day, at least one day of the week or of the month, and at least one month of the year;
associating at least one state or change of state of a signal from the sensor to be parameterized with at least one control scenario; and
storing the at least one control scenario in the control unit;
wherein the at least one control scenario is selected according to the at least one periodic activation time range and/or at least one periodic inhibition time range associated with the sensor to be parameterized and according to at least one state or change of state of a signal from corresponding the parameterized sensor, and
wherein the at least one control scenario stored in the control unit includes at least one order configured to be sent to at least one of the pieces of controlled home automation equipment, the at least one order controlling the at least one of the pieces of controlled home automation equipment.

13. A control unit for communicating with several sensors and several pieces of controlled home automation equipment of a home automation installation,
wherein the control unit includes:
first communication means for receiving signals from the sensors;
storage means comprising a memory for storing one or more control scenarios,
wherein each of the control scenarios is previously created by a programming interface connected to the control unit, and
wherein each of the control scenarios is selected according to at least one periodic time range associated with at least one parameterized sensor from among the sensors, and according to at least one state or change of state of a signal from the corresponding parameterized sensor, during a parameterization procedure;
processing means for selecting at least one current control scenario from among the one or more stored control scenarios that has been previously created by a programming interface connected to the control unit and stored in the control unit, when a current value from the parameterized sensor associated with the current control scenario is received by the control unit and when the current value corresponds to the associated periodic time range; and
second communication means for sending the piece of controlled home automation equipment at least one order depending on the current control scenario, the order configured to control the piece of controlled home automation equipment.

14. A control assembly including:
a programming interface connected to a control unit,
wherein the programming interface includes:
a graphic display displaying:
at least one screen to choose a sensor to be parameterized from among the sensors;
at least one screen for associating the sensor to be parameterized with at least one periodic activation time range and/or at least one periodic inhibition time range; and
at least one screen for associating at least one control scenario with at least one state or change of state of the signal from the sensor to be parameterized;
wherein the programming interface is configured, during a parametrization procedure, to associated the sensor with the at least one at least one periodic activation time range and/or at least one periodic inhibition time range and associate the at least one control scenario with at least one state or change of state of the signal from the sensor; and
a control unit for communicating with several sensors and several pieces of controlled home automation equipment of a home automation installation,
wherein the control unit includes:
communication means for receiving signals from the sensors;
storage means comprising a memory for storing the one or more control scenarios that were created during the parameterization procedure,
means for selecting at least one current control scenario from among the one or more stored control scenarios that has been previously created by means of the programming interface connected to the control unit and stored in the control unit, when a current value from the parameterized sensor associated with the current control scenario occurs is received by the control unit and when the current value corresponds to the associated periodic time range; and
means for sending the piece of controlled home automation equipment at least one order depending on the current control scenario, the order configured to control the piece of controlled home automation equipment.

15. A home automation installation including several sensors, several pieces of controlled home automation equipment, a control unit communicating with the sensors and pieces of controlled home automation equipment, and a programming interface connected to the control unit,
  wherein the programming interface includes:
    communication means for communicating with the control unit; and
    means for creating at least one control scenario,
    wherein the means for creating at least one control scenario is configured to:
      select at least one parameterized sensor from among the sensors;
      associate a periodic time range, from among one or more time ranges, with the parameterized sensor, wherein said periodic time range is defined by one or more of: at least one time range during a day, at least one day of the week or of the month, and at least one month of the year; and
      associate at least one least one state or change of state of a signal from the parameterized sensor with the at least one control scenario;
    wherein the at least one control scenario is selected according to the periodic time range associated with the parameterized sensor and according to the at least one state or change of state of a signal from the corresponding parameterized sensor;
    wherein the communication means is configured to transmit the at least one control scenario to the control unit;
  wherein the control unit includes:
    communication means for receiving signals from the sensors;
    storage means comprising a memory for storing the one or more control scenarios created and communicated by the programming interface;
    processing means for:
      selecting at least one current control scenario from among the one or more stored control scenarios that has been previously created by means of a programming interface connected to the control unit and stored in the control unit, a current value from the parameterized sensor associated with the current control scenario is received by the control unit and when the current value corresponds to the associated periodic time range; and
      sending to at least one of the pieces of controlled home automation equipment, at least one order depending on the selected control scenario as stored in the control unit and created by the programming interface, wherein the order is configured to control the at least one of the pieces of controlled home automation equipment.

16. The home automation installation of claim 15, wherein the programming interface includes a graphic display displaying:
  at least one screen to choose a sensor to be parameterized from among the sensors;
  at least one screen for associating the sensor to be parameterized with at least one periodic activation time range and/or at least one periodic inhibition time range; and
  at least one screen for associating at least one control scenario with at least one state or change of state of the signal from the sensor to be parameterized.

17. The home automation installation of claim 15,
  wherein at least one of the sensors make up units that are structurally distinct from the control unit, and arranged in separate housings, not integrated into a housing of the control unit and remote from the housing of the control unit.

18. The home automation installation of claim 15,
  wherein at least one of the pieces of controlled home automation equipment make up units that are structurally distinct from the control unit and arranged in distinct housings not integrated into a housing of the control unit and remote from the housing of the control unit.

* * * * *